United States Patent

[11] 3,598,365

[72] Inventor Bruno H. Werra
Waukesha, Wis.
[21] Appl No 853,796
[22] Filed Aug. 28, 1969
[45] Patented Aug. 10, 1971
[73] Assignee Ladish Co.
Cudahy, Wis.

[54] BUTTERFLY VALVES
10 Claims, 6 Drawing Figs.
[52] U.S. Cl. .............................................. 251/307,
277/211, 285/336, 285/365
[51] Int. Cl. ...................................................... F16k 1/22,
B65d 53/02, F16l 19/02
[50] Field of Search............................................ 251/148,
152, 306, 307, 170; 285/365, 367, 336; 277/211;
137/454.2

[56] References Cited
UNITED STATES PATENTS
2,789,844  4/1957  Kessler........................  285/365 X
3,235,293  2/1966  Condon.......................  285/367 X
3,369,791  2/1968  Snodgrass et al. ............  251/307 X Primary Examiner—Henry T. Klinksiek
Attorney—Morsell and Morsell ABSTRACT: A metal butterfly valve operates in a resilient valve seat which is interposed as a gasket between the flanges of two pipe ends, the seat having portions which project radially outwardly beyond the pipe flanges and which have tapered sides to match the tapers of the pipe flanges. Semicircular clamping elements act on the tapers of both the flanges and the valve seat to create a seal between the pipe ends The bore of the resilient seat has opposed openings at the 6:00 and 12:00 o'clock positions through which the valve stem passes. The internal diameter of the seat is slightly greater, before assembly, along an imaginary line extending through the 3:00 and 9:00 o'clock positions and connecting the splits of the clamping elements than along a line extending through the 6:00 and 12:00 o'clock positions. In addition, between the 11:00 and 5:00 o'clock and the 1:00 and 7:00 o'clock positions the internal diameter of the seat is less than the beforementioned diameters, being struck from a longer radius, which radius has its center at eccentric points beyond the true center of the bore of the seat. The valve stem openings in the resilient seat are recessed from the OD to receive the lower extensions of valve stem bushings, which, in assembly, serve to compress the material around the valve stem holes to increase the stem sealing pressures. The construction of the seat is such that, after assembly, there is a relatively uniform seal all around the valve disk without interference with operating movement of the valve disk.

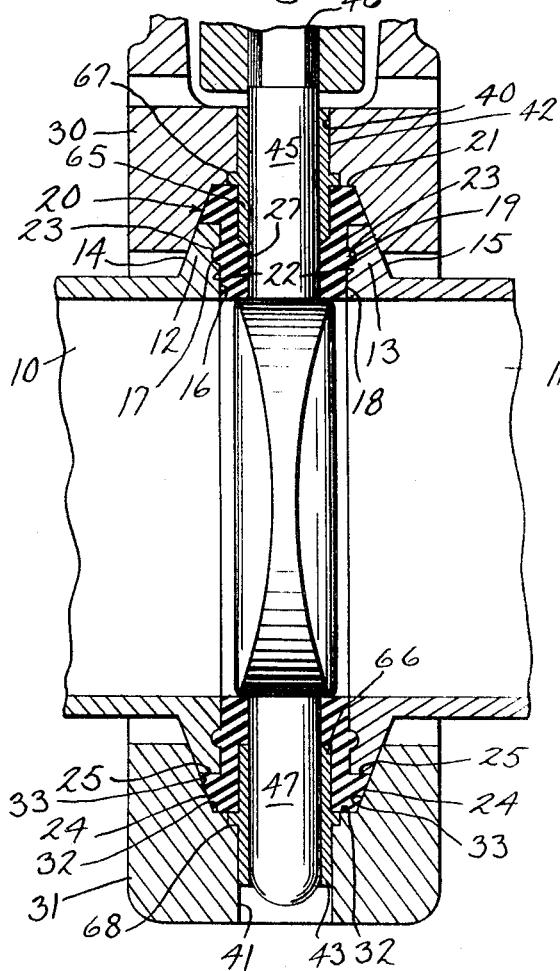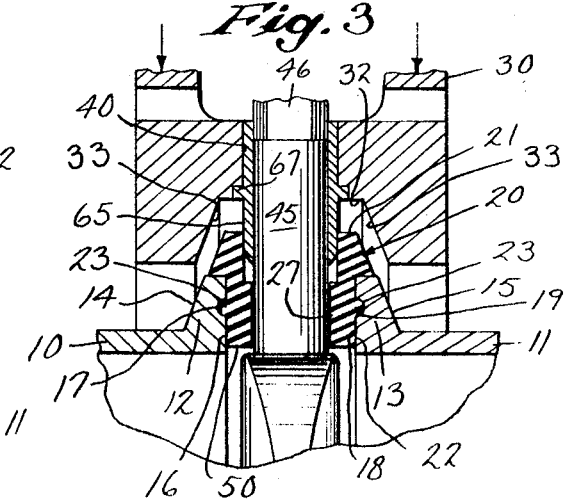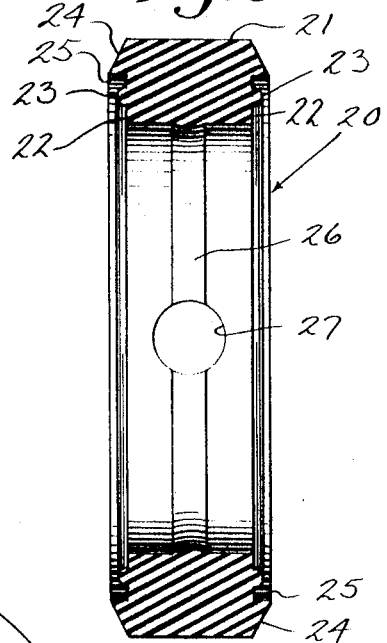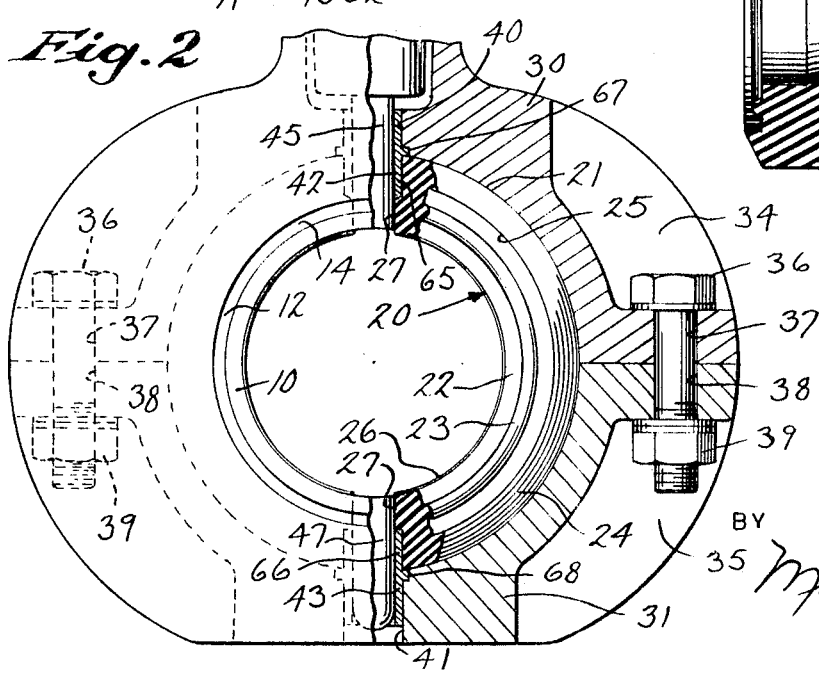

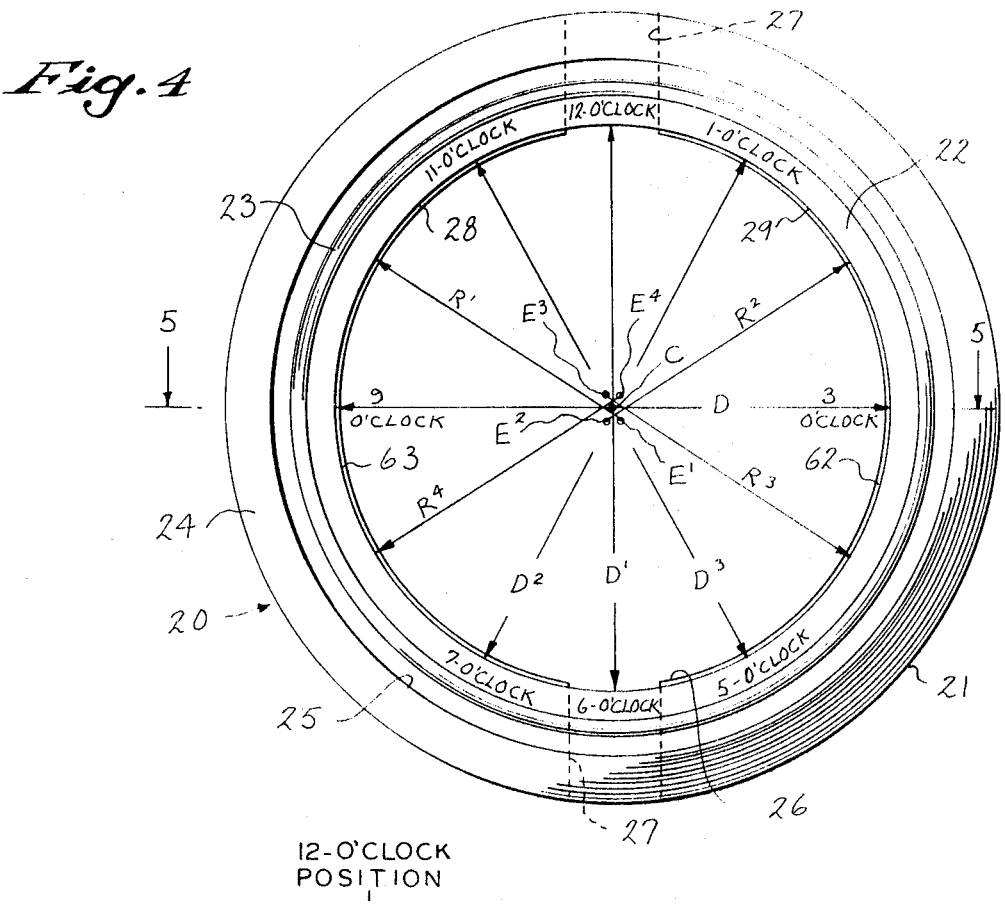
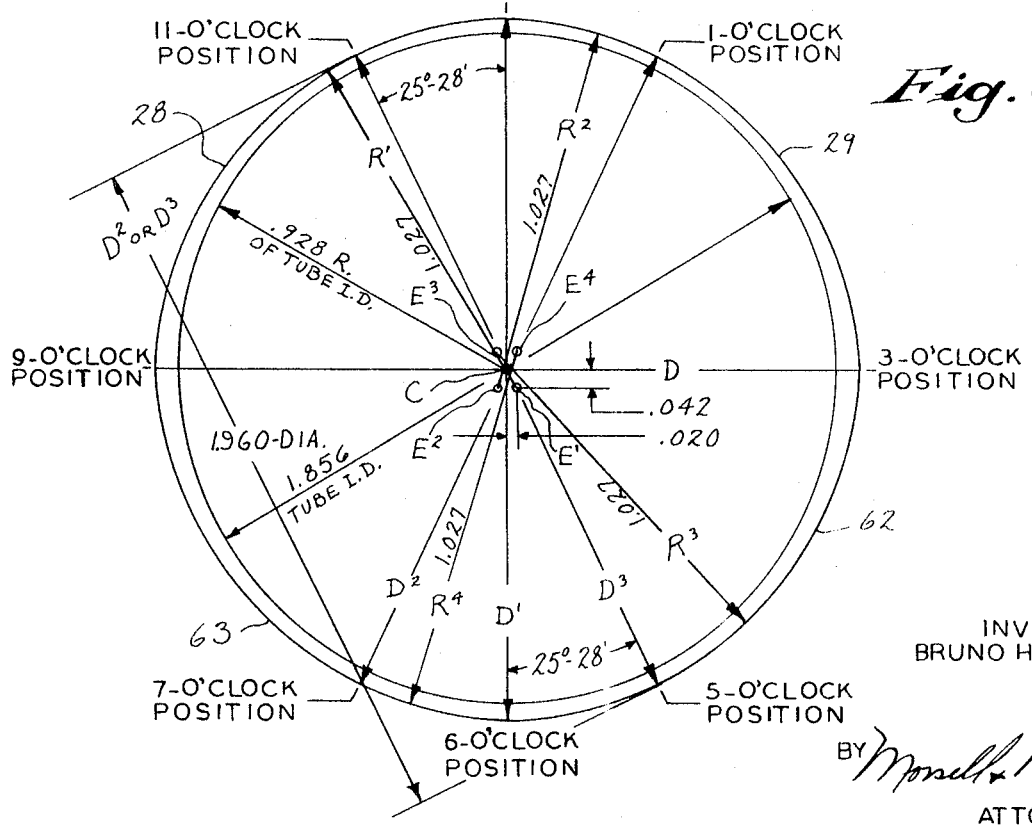

BUTTERFLY VALVES

BACKGROUND OF THE INVENTION

1. Field of the Invention

The present invention pertains to butterfly valves having resilient seats which are positioned between two flanged pipe ends to form both a gasket and a valve seat. The valve is suitable for use in pipe lines through which fluids such as water, liquid foods, and chemicals may pass, as well as air, steam and other gases.

2. Description of the Prior Art

Heretofore butterfly valves have been proposed in which resilient valve seats are positioned between two flanged pipe ends to form both a gasket between pipe ends and a resilient seat for the butterfly valve. In the majority of these constructions as heretofore proposed, such as the valves shown in various Stillwagon patents, there is a circular metal valve body which is positioned between flanged pipe ends and which carries the resilient valve body on its inside diameter. In these constructions the joint is taken up by axially extending bolts extending through the valve body which exert an axial force on the resilient seat. Stillwagon U.S. Pat. No. 3,129,920 discloses a somewhat different type of construction wherein the valve body is formed by two semicircular clamping segments which are drawn together by nuts and bolts to exert axial pressure on the resilient gasket. In this patent there is no coaction with tapered flanges and there is no means for controlling the final shape of the resilient gasket to insure that there will be a proper seal without interfering with operating movement of the valve disk.

SUMMARY OF THE INVENTION

The present invention provides, in a butterfly valve of the type having a resilient ring interposed between the flanges of two pipe ends to form both a gasket and a resilient valve seat, two semicircular clamping segments having grooves with tapered faces which coact with tapers on the pipe flanges and also with tapers on projecting portions of the resilient gasket. This applies both axial and radial forces to the gasket during assembly, thereby insuring a proper seal around the valve disk without causing binding during operation, the ID of the resilient valve seat before assembly being modified from a true circular shape to allow for inward compression at the sides during assembly and provide a proper seal without interfering with operating movement of the valve disk.

One of the objects of the present invention is to prevent excessive resistance to closing movement of the valve at the sides of the valve seat and along a line connecting the splits of the clamping ring, at which location the greatest compressive forces occur.

A further object of the invention is to provide a construction as above described wherein there is a uniform seal all the way around the valve disk.

A further object of the invention is to provide a butterfly valve which will withstand relatively high pressures without leakage.

A further object of the invention is to provide a butterfly valve assembly as above described wherein there are cooperating semicircular clamping ring segments, with the cross-sectional shape of the resilient gasket such that takeup action brings about both axial and radial forces on the gasket to create a uniform seal around the valve disk. Advantage is taken in the geometric design of the fact that rubber and rubberlike elastomeric materials are incompressible and therefore must flow to adjacent areas and respond with their elastic properties.

A further object of the invention is to provide a butterfly valve assembly which is so constructed that it may be readily employed at any sealed joint which is of the type shown in Kessler U.S. Pat. No. 2,789,844, by substituting the resilient butterfly seat of the present invention for the gasket of one of said patented joints, and by employing the clamping elements of the present invention to close the same joint.

With the above and other objects in view, the invention consists of the improved butterfly valve, and all of its parts and combinations, as set forth in the claims, and all equivalents thereof.

BRIEF DESCRIPTION OF THE DRAWINGS

In the drawings, illustrating one complete embodiment of the preferred form of the invention, in which the same reference numerals designate the same parts in all of the views:

FIG. 1 is a longitudinal sectional view through two connected pipe ends of the type used in the sealed joint of U.S. Pat. No. 2,789,884, with the improved butterfly valve incorporated in the joint;

FIG. 2 is an end view of the structure of FIG. 1, part being broken away and shown in transverse section;

FIG. 2 is a view similar to the upper portion of FIG. 1 showing the parts before takeup of the clamping segments has been completed;

FIG. 4 is a plan view of the resilient gasket alone before assembly;

FIG. 5 is a sectional view taken on the line 5–5 of FIG. 4; and

FIG. 6 is a diagrammatic view showing the development of the internal contour of the sealing ring as compared with the internal diameter of the metal pipes.

DESCRIPTION OF THE PREFERRED EMBODIMENTS

Referring now more particularly to the drawings, the numerals 10 and 11 designate pipe ends having end flanges 12 and 13 which are like those of Kessler U.S. Pat. No. 2,789,844. The flange 12 has a tapered outer face 14 and the flange 13 has a similarly tapered outer face 15. The flange 12 has a flat inner face 16 provided with a circular groove 17 (see FIG. 1) like that used in constructions manufactured under U.S. Pat. No. 2,789,844. The flange 15 has a similar flat inner face 18 provided with a similar circular groove 19 (see FIG. 1).

A resilient gasket 20 may be formed of a suitable rubberlike material such as rubber or synthetic rubber or other elastomeric material, but it is preferred to use a Terpolymer of Ethylene Propylene such as EPT. The gasket, which also forms a valve seat, has a cylindrical outer periphery 21 which is flat in cross section, and has flat end face portions 22 formed with circular beads 23 which are adapted to be received in the circular grooves 17 and 19 of the pipe end flanges. Near the outer periphery, each end face of the gasket has an annular rib 24 which is offset outwardly from the end face portions 22 and which has a tapered outer face, the taper of this outer face, while being equal, is somewhat inboard of the ferrule taper 14, there being shoulders 25 between the tapered portions and the straight end face portions 22.

The inner periphery or bore of the gasket has an inwardly-projecting circumferential rib 26 (see FIG. 5) which forms the seat for the butterfly valve. This bore and rib depart from a true circle, being in the form of a modified ellipse. The inner periphery has oppositely disposed valve stem holes 27.

Referring to FIG. 6, which shows the preferred ID of the so-called 2 inch gasket (disregarding the rib 26), the arcuate portion 28 which extends for 90° from the 9:00 o'clock position to the 12:00 O'clock position is on a longer radius $R^1$ which is struck from an eccentric point $E^1$ which is beyond and below the center point. The arcuate portion 29 which extends from the 12:00 O'clock position to the 3:00 o'clock position is on a longer radius $R^2$ which is struck from an eccentric point $E^2$ which is beyond and below the center point. The arcuate portion 62 which extends from the 3:00 o'clock position to the 6:00 O'clock position is also on a longer radius $R^3$ which is struck from the point $E^3$ beyond and above the center, as shown in FIG. 4. The arcuate portion 63 which extends from the 6:00 O'clock position to the 9:00 o'clock position is on a longer radius $R^4$ which is struck from the eccentric point $E^4$ beyond and above the center. The eccentric points $E^1$ through E⁴ are spaced a greater distance from the diameter D than from the diameter D¹. This distance is in the neighborhood of twice as great. The radii R¹ through R⁴ are all of the same length and of a substantially greater length than the radius of the butterfly valve. On a so-called 2 inch gasket these radii are 1.027 of an inch, the ID along the diameter D¹ being 1.970. The result of this arrangement is that the diameter D, which is 2.012, is slightly greater than the diameter D¹. Also, the diameter D² which connects the so-called 1:00 o'clock position (25°28′ to the right of D¹) and the so-called 7:00 o'clock position (25°28′ to the left of D¹); and the diameter D³ which connects the so-called 11:00 o'clock position (25°28′ to the left of D¹) and the so-called 5:00 o'clock position (25°28′ to the right of D¹) are less than either the diameter D or the diameter D¹ being 1.960 of an inch. On a so-called 2 inch gasket the eccentric points E¹ through E⁴ are each spaced 0.020 of an inch from the diameter D¹ are are each spaced 0.041 of an inch from the diameter D. The so-called 11:00 o'clock, 5:00 o'clock, 1:00 o'clock and 7:00 o'clock terms are used for convenience as these locations are not accurate, the actual positions being 25°28′ from the axis through the valve stem openings. The dimensions given above are merely illustrative as these will of course vary on gaskets of different sizes. The so-called 2 inch gasket has been given as a typical example.

A pair of semicircular clamping segments 30 and 31 have grooves 32 with diverging sidewalls 33. The clamping segment 30 has bolt-receiving recesses 34. The clamping segment 31 has similar recesses 35. Bolts 36 which are adapted to extend through holes 37 and 38 in the clamping members have nuts 39 threaded thereon to provide for takeup of the clamping segments, as is clear from FIG. 2. The clamping segment 30 has a valve stem bore 40, and the clamping segment 31 has a valve stem bore 41. The bore 40 is fitted with a metal bushing 42, and the bore 41 is fitted with a metal bushing 43.

A metal valve disk 44 has a stem member 45 projecting rigidly therefrom, the stem preferably having a modified hex-shaped end portion 46 for receiving an operating member. Diametrically opposite the stem 45 is a stem portion 47. The stem portion 45 extends rotatably through one of the stem bores 27 in the gasket and through the bushing 42. The stem portion 47 extends rotatably through the opposite stem bore 27 of the gasket and through the bushing 43. The bushings 42 and 43 have inner ends 65 and 66 projecting into enlarged bore portions of the stem holes in the gasket 20, as shown in FIGS. 1 and 3. The bushings have shoulders 67 and 68 intermediate their length which are received in counterbores in the clamping segments 30 and 31, and which are adapted to press against the periphery of the gasket 20 when the clamping segments are taken up by tightening the bolts 36. The bushing portions 65 and 66, which are inwardly of the shoulders 67 and 68, are slightly longer than the enlarged outer portions of the stem hole openings of the gasket 20. Thus, when the clamping segments 30 and 31 are tightened, there is a pressure exerted on the material of the gasket 20 which pushes the gasket material into firm contact with the stem and into firm contact with the butterfly valve in the region of the valve stem holes.

ASSEMBLY AND OPERATION

The gasket is assembled between the two flanges 12 and 13 of the pipe ends, as shown in FIG. 3, with the circular ribs 23 of the gasket fitting in the grooves 17 and 19 of the flanges. In addition, the annular shoulders 25 of the gasket seat on the flattened peripheral portions 48 (FIG. 3) of the flanges 12 and 13. Next the clamping segments 30 and 31 are assembled in the manner shown in FIGS. 2 and 3 with the nuts and bolts inserted as shown in FIG. 2. Before takeup of the nuts the ID of the gasket will be greater than the ID of the pipe ends, as indicated at 50 in FIG. 3. In addition, the tapered faces 14 and 15 of the flanges 12 and 13 will be offset outwardly slightly from the tapered face portions 24 of the gasket as shown in FIG. 3. As the nuts 39 are taken up, the clamping members will be drawn together. The tapers 33 of the clamping segments act first on the tapered faces 14 and 15 of the pipe end flanges, bringing said flanges closer to each other and exerting an axial squeeze on the resilient gasket material. This causes the gasket material to move inwardly on the ID to move toward a flush condition with the bores of the pipe ends. Thereafter the tapers 24 on the gasket substantially align with the tapers 14 and 15 on the pipe flanges so that with further clamping pressure the tapers 33 of the clamping segments also act directly on the tapers 24 of the gasket as well as on the tapers of the flanges. This increases the squeezing effect on the rubber. Thereafter the clearance 51 at the OD of the gasket will be taken up and, upon further tightening of the nuts 39, there will be no other place for the rubber to go but inwardly at 50 (FIG. 3). This further action will be caused by further movement of the pipe end flanges 12 and 13 toward one another, by action directly on the tapers 24 of the rubber gasket, and by external peripheral pressure from the bottom of the clamping segment grooves acting on the outer periphery of the gasket.

During the takeup of the clamping segments 30-31 the greatest inward compression at the ID of the gasket will be along the line D of FIG. 4. Because of the limiting factor upon the amount of compression along the diameter D¹ due to the valve stems 45 and 47 passing through the rubber, there is less compression along the line D¹ than along the line D. The least distortion during takeup takes place along the diameters D² and D³ taken through the 1:00 o'clock and 7:00 o'clock and the 11:00 o'clock and 5:00 o'clock positions. It is for this reason that the length of these diameters is less than the length at either D or D¹. Thus the net result after assembly is a round bore for the gasket which is substantially flush with the bores of the pipe ends, except for the slight raised bead at the center periphery of the gasket.

As a result of the above construction, the problem of having the sealing ring exert too much friction on the valve member at the sides is eliminated. In addition, the arrangement is such as to provide a very tight seal between the pipe ends, and around the valve disk so that the assembly will withstand relatively high pressures without leakage. The valve was found not to leak at 300 lbs. pressure. By having the initial offset between the tapers 24 and the tapers 14-15 of the pipe flanges, as shown in FIG. 3, there is no danger during initial clamping action of forcing the rubber outwardly and down over the shoulders 48.

Various changes and modifications may be made without departing from the spirit of the invention, and all of such changes are contemplated as may come within the scope of the claims.

What I claim is:

1. In combination with a pair of tubular members having outwardly projecting annular end flanges with opposing annular end faces, the opposite face of each flange being outwardly tapered and each flange having a cylindrical peripheral portion; an annular sealing gasket of resilient material which is preformed to be T-shaped in cross section having its inner portion interposed between said annular end faces of the flanges and having a bore forming a valve seat, said gasket having diametrically-opposite radially extending valve stem openings and having a preformed widened portion in cross section located outwardly of the peripheral portions of the flanges providing laterally projecting annular portions with cylindrical internal shoulders overlapping and fitted against said cylindrical peripheral portions of the flanges; a butterfly valve disk having stems extending rotatably through said gasket openings and having a peripheral sealing edge, said disk being mounted in the gasket for movement on the axis of said stems between a sealing position wherein the sealing edge is in sealing engagement with the resilient seat and an open position permitting flow through the gasket bore; a pair of clamping segments having stem bearings in alignment with the stem openings of the gasket in which said valve stems are journaled, each clamping segment having a groove with tapered sides shaped to coact with said outwardly tapered faces of the flanges, said preformed laterally projecting annular overlapping portions of the gasket being accommodated in said grooves and having sides tapered similarly to the tapers of the sides of the grooves, and each groove having a bottom spaced outwardly from the peripheral portions of the flanges to provide an annular space accommodating the preformed widened portion of the gasket with the cross-sectional shapes of the space and gasket being substantially the same in assembled condition; and means for drawing the segments together to draw the flanges toward one another and compress the gasket.

2. A combination as set forth in claim 1 in which the outer portions of the stem openings of the gasket are of enlarged diameter, and in which the stem openings of the clamping segments are fitted with bushings movable with the segments and having extensions which project into and fill the enlarged outer portions of the openings of the gasket.

3. A combination as set forth in claim 2 in which said bushing extensions are of slightly greater length than the length of the enlarged portions of the stem openings of the gasket to compress the material which is inwardly of the bushing extensions around the valve stem openings and increase stem sealing pressures after takeup of the clamping segments.

4. For use with a pair of tubular members having outwardly projecting annular end flanges with opposing annular end faces which are adapted to be drawn together by a pair of clamping segments each of which has a groove with tapered sides shaped to coact with said outwardly tapered faces of the flanges, and there being a parting line between said clamping segments extending in a diametrical direction with respect to said tubular members, an annular sealing gasket of resilient material having its inner portion adapted to be clamped between said annular end faces and having a bore, the improvement comprising each quadrant of the bore of said gasket being on a radius struck from a center which is offset beyond the center of said tubular members whereby the dimension of the bore of the gasket along the transverse parting line between clamping segments is of slightly increased length as compared with the dimension of the bore of the gasket along a line at right angles to said parting line to thereby allow for extra compression of the gasket along the parting line during clamping.

5. An annular sealing gasket as claimed in claim 4 in which the bore of the gasket is adapted to form a valve seat and in which the gasket has diametrically-opposite radially extending openings for the stems of a butterfly valve, and in which the dimension of the bore of the gasket which is of increased length is along a line at right angles to the axis of the valve stem openings and is of slightly increased length as compared with the dimension of the bore of the gasket along a line through the axis of the valve stems.

6. An annular sealing gasket as claimed in claim 4 in which the gasket has a preformed widened portion in cross section near its periphery adapted to be positioned outwardly of the peripheries of annular end flanges of tubular members used therewith to overlap the same.

7. A combination as set forth in claim 5 in which the axis of the valve stem openings is on a line connecting the 12 and 6 o'clock positions, and in which those dimensions of the bore of the gasket which are adjacent a line connecting the 5 and 11 o'clock positions or adjacent a line connecting the 7 and 1 o'clock positions are of less length than the dimension of the bore through the axis of the valve stems and of less length than the dimension of the bore along a line at right angles to the axis of the valve stem openings.

8. In combination with a pair of tubular members having outwardly projecting annular end flanges with opposing annular end faces, the opposite face of each flange being outwardly tapered, an annular sealing gasket of resilient material interposed between said annular end faces and having a bore forming a valve seat, said gasket having diametrically-opposite, radially extending valve stem openings, the outer portions of which are of enlarged diameter, a butterfly valve disk having stems extending rotatably through said stem openings of the gasket and having a peripheral sealing edge, said disk being mounted in the gasket for movement on the axis of said stems between a sealing position wherein the sealing edge is in sealing engagement with the resilient seat and an open position permitting flow through the gasket bore, a pair of clamping segments having valve stem openings in alignment with the stem openings of the gasket, a bushing within the stem opening of each clamping segment within which the valve stem is journaled, each bushing having an extension which projects into and fills the enlarged outer portions of the stem openings of the gasket, and means for drawing the segments together to draw the flanges toward one another and compress the gasket.

9. A combination as claimed in claim 8 in which there is means between the clamping segments and the bushings for causing inward radial movement of the bushing extensions relative to the gasket as the clamping segments are drawn together.

10. A combination as claimed in claim 8 in which the bushing extensions are of greater length than the length of the enlarged portions of the stem openings of the gasket to engage the bottoms of said enlarged portions and compress the material which is inwardly of the bushing extensions around the valve stem openings to increase stem sealing pressures after takeup of the clamping segments.